US011906148B1

(12) United States Patent
Wang

(10) Patent No.: US 11,906,148 B1
(45) Date of Patent: Feb. 20, 2024

(54) THREE-DIMENSIONAL MODELING LAMP AND MANUFACTURING METHOD THEREOF

(71) Applicant: Linbin Wang, Ningbo (CN)

(72) Inventor: Linbin Wang, Ningbo (CN)

( * ) Notice: Subject to any disclaimer, the term of this patent is extended or adjusted under 35 U.S.C. 154(b) by 0 days.

(21) Appl. No.: 18/223,028

(22) Filed: Jul. 18, 2023

(51) Int. Cl.

| | |
|---|---|
| ***F21V 3/02*** | (2006.01) |
| ***F21S 4/24*** | (2016.01) |
| ***F21V 3/06*** | (2018.01) |
| ***F21V 9/08*** | (2018.01) |
| ***F21Y 115/10*** | (2016.01) |

(52) U.S. Cl.
CPC ................. *F21V 3/02* (2013.01); *F21S 4/24* (2016.01); *F21V 3/062* (2018.02); *F21V 9/08* (2013.01); *F21Y 2115/10* (2016.08)

(58) Field of Classification Search
CPC ... F21V 3/02; F21V 3/062; F21V 9/08; F21V 23/04; F21S 4/24; F21Y 2115/10; F21W 2121/00
See application file for complete search history.

(56) References Cited

U.S. PATENT DOCUMENTS

| | | | | |
|---|---|---|---|---|
| 9,206,952 | B2 * | 12/2015 | Gold | B01F 21/22 |
| 9,897,277 | B2 * | 2/2018 | Smith | F21V 1/26 |
| 11,435,060 | B1 * | 9/2022 | Zhang | F21V 17/02 |
| 2013/0016501 | A1 * | 1/2013 | Zinox | F21S 9/037 362/183 |

FOREIGN PATENT DOCUMENTS

| | | | |
|---|---|---|---|
| WO | WO 2016/186497 | * 11/2016 | F21V 3/02 |

* cited by examiner

*Primary Examiner* — Peggy A Neils

(57) ABSTRACT

The present invention discloses a novel three-dimensional modeling lamp and a manufacturing method thereof. The lamp comprises a lamp shell and a light source arranged in the lamp shell, wherein the lamp shell forms a preset three-dimensional modeling by connecting a plurality of sheets with different shapes through connectors, and the sheets comprise a light-transmitting PET layer and a colorful film layer, the colorful film layer refracts light emitted by the light source, so that the lighting effect of the three-dimensional modeling lamp is better; and a plurality of indentations are formed on the sheets, and the indentations guide users to splice and shape the sheets more conveniently. The manufacturing method comprises the following steps: selecting corresponding sheets according to the preset size and external shape of the three-dimensional modeling lamp, and carrying out indentation treatment on the sheets to facilitate the installation of users.

9 Claims, 10 Drawing Sheets a, selecting a PET material with corresponding size and thickness according to a preset body size of the three-dimensional modeling lamp, and flatly adhering a colorful film on one or both sides of the PET material by a laminating machine

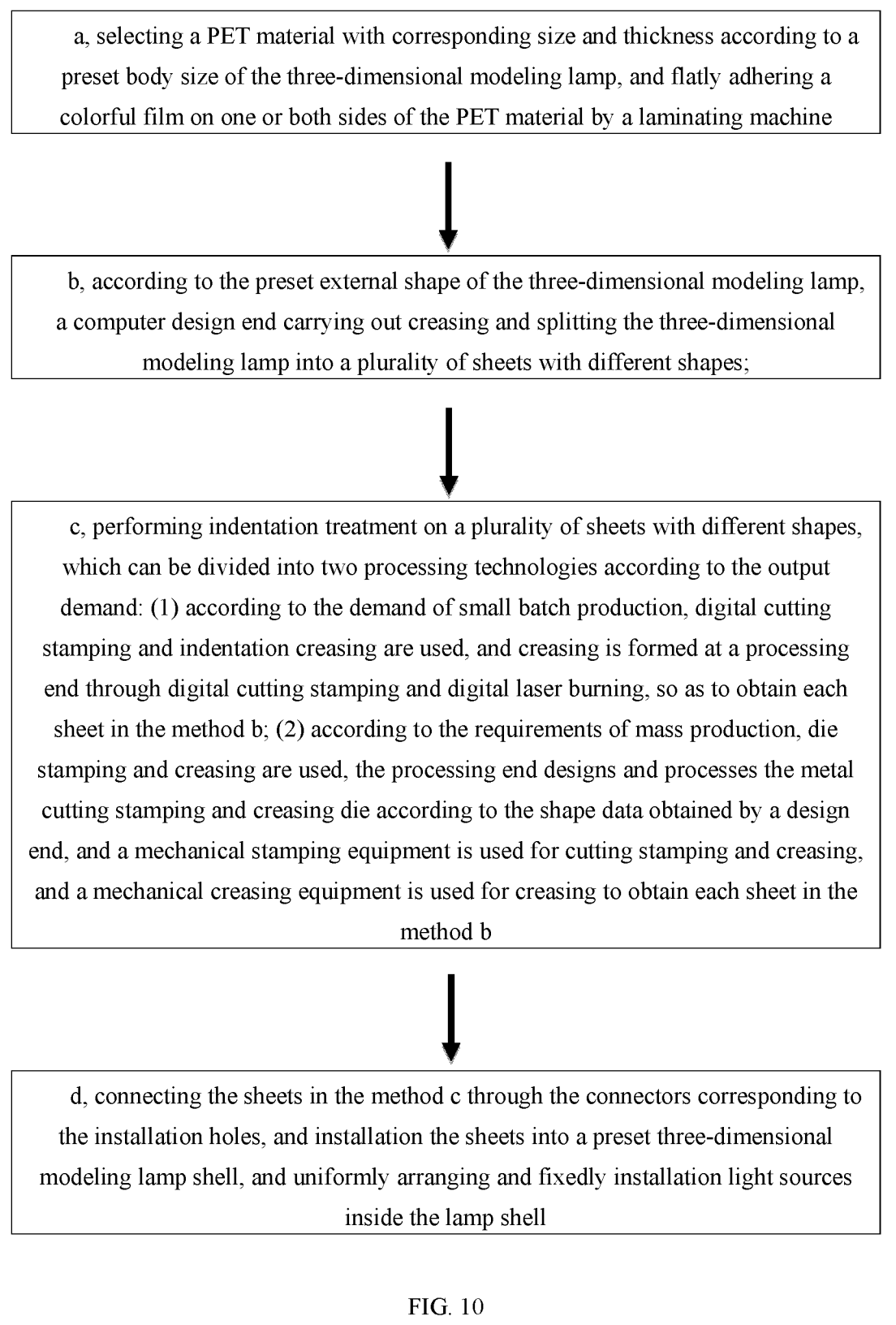

↓ b, according to the preset external shape of the three-dimensional modeling lamp, a computer design end carrying out creasing and splitting the three-dimensional modeling lamp into a plurality of sheets with different shapes;

↓ c, performing indentation treatment on a plurality of sheets with different shapes, which can be divided into two processing technologies according to the output demand: (1) according to the demand of small batch production, digital cutting stamping and indentation creasing are used, and creasing is formed at a processing end through digital cutting stamping and digital laser burning, so as to obtain each sheet in the method b; (2) according to the requirements of mass production, die stamping and creasing are used, the processing end designs and processes the metal cutting stamping and creasing die according to the shape data obtained by a design end, and a mechanical stamping equipment is used for cutting stamping and creasing, and a mechanical creasing equipment is used for creasing to obtain each sheet in the method b

↓ d, connecting the sheets in the method c through the connectors corresponding to the installation holes, and installation the sheets into a preset three-dimensional modeling lamp shell, and uniformly arranging and fixedly installation light sources inside the lamp shell

FIG. 10

THREE-DIMENSIONAL MODELING LAMP AND MANUFACTURING METHOD THEREOF

TECHNICAL FIELD

The present invention relates to the technical field of lamps, in particular to a novel three-dimensional modeling lamp and a manufacturing method thereof.

BACKGROUND

With the development of society, people's quality of life is getting higher and higher. In various festivals and festive occasions, such as Christmas, people usually use various decorations to decorate the environment and add a festive atmosphere to the festival. In addition, people often give decorations as gifts to their friends. At present, there are many decorations on the market, among which, decorative lamps that can emit light have a good effect of setting off the atmosphere, so they are deeply loved by people.

Traditional decorative lamps generally install a number of light-emitting bulbs on the planar modeling base plate, and then a modeling frame with certain decorative effect is sleeved on the modeling base plate to achieve the decorative purpose. In order to improve the decorative effect, manufacturers generally install light-emitting bulbs with different colors on the planar modeling base plate, although the light-emitting bulbs with different colors can emit light with different colors, thus achieving a better decorative effect on the surrounding environment. However, because the light-emitting bulbs in the traditional technology are all installed on the modeling base plate with a single-layer plane structure, no matter whether the light-emitting bulbs with a single color or multiple colors are used, when the light-emitting bulbs emit light, there is no layering between the lights emitted by the light-emitting bulbs, which leads to the unsatisfactory decorative effect of decorative lamps.

In order to solve the above problems, in the prior art, light-emitting bulbs are connected in series and wound on a three-dimensional structure frame to form a three-dimensional decorative lamp. However, in the prior art, the light-emitting bulbs of the three-dimensional decorative lamp are directly connected in series through wires to form a light string, and the light string is directly wound on the three-dimensional structure frame, so that the light-emitting bulbs are exposed on the three-dimensional structure frame, so that the light-emitting bulbs are easily damaged, the appearance is not beautiful, and the lighting effect is not ideal.

Similarly, in the prior art, the decorative lamps have already set the structural frame before leaving the factory, and the lamp shell is generally made by injection molding, so the external shape and outline can not be changed after injection molding, and the style is relatively simple. At the same time, the traditional three-dimensional modeling lamps have problems such as large volume, high logistics cost, and easy collision in transportation, which need to be improved.

Based on the above problems, it is necessary to put forward a brand-new three-dimensional modeling lamp, which can be assembled by users themselves, fully reflecting the creative inspiration of users, and at the same time, the three-dimensional lighting effect of the lamp is further improved and the decorative effect is better.

SUMMARY

The present invention provides a novel three-dimensional modeling lamp, which includes a lamp shell and a light source arranged in the lamp shell, wherein the lamp shell forms a preset three-dimensional modeling by connecting a plurality of sheets with different shapes through connectors, and the sheets comprise a light-transmitting PET layer and a colorful film layer; the colorful film layer refracts light emitted by the light source, so that the lighting effect of the three-dimensional modeling lamp is better; and a plurality of indentations are formed on the sheets, and the indentations guide a user to splice and shape the sheets more conveniently and more quickly.

The present invention further provides a lamp shell and a light source installed inside the lamp shell, wherein the lamp further comprises a plurality of skeletons; the plurality of skeletons are spliced to form a three-dimensional skeleton modeling; the lamp shell is formed by connecting a plurality of sheets with different shapes through connectors and the three-dimensional skeleton modeling is covered correspondingly one by one; wherein the sheets comprise a light-transmitting PET layer and a colorful film layer, and the colorful film layer refracts light emitted by the light source, so that the lighting effect of the three-dimensional modeling lamp is better; and a plurality of indentations are formed on the sheets, and the indentations guide a user to splice and shape the sheets more conveniently.

The present invention also provides a method for manufacturing a novel three-dimensional modeling lamp, including:

a, selecting a PET material with corresponding size and thickness according to a preset body size of the three-dimensional modeling lamp, and flatly adhering a colorful film on one or both sides of the PET material by a laminating machine;

b, according to the preset external shape of the three-dimensional modeling lamp, a computer design end carrying out creasing and splitting the three-dimensional modeling lamp into a plurality of sheets with different shapes;

c, performing indentation treatment on a plurality of sheets with different shapes, which can be divided into two processing technologies according to the output demand: (1) according to the demand of small batch production, digital cutting stamping and indentation creasing are used, and creasing is formed at a processing end through digital cutting stamping and digital laser burning, so as to obtain each sheet in the method b; (2) according to the requirements of mass production, die stamping and creasing are used, the processing end designs and processes the metal cutting stamping and creasing die according to the shape data obtained by a design end, and a mechanical stamping equipment is used for cutting stamping and creasing, and a mechanical creasing equipment is used for creasing to obtain each sheet in the method b; and d, connecting the sheets in the method c through the connectors corresponding to the installation holes, and installation the sheets into a preset three-dimensional modeling lamp shell, and uniformly arranging and fixedly installation light sources inside the lamp shell.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

FIG. 10 is a flowchart of a method for manufacturing a novel three-dimensional modeling lamp provided by the present invention.

IN THE FIGURES

Figure 1:
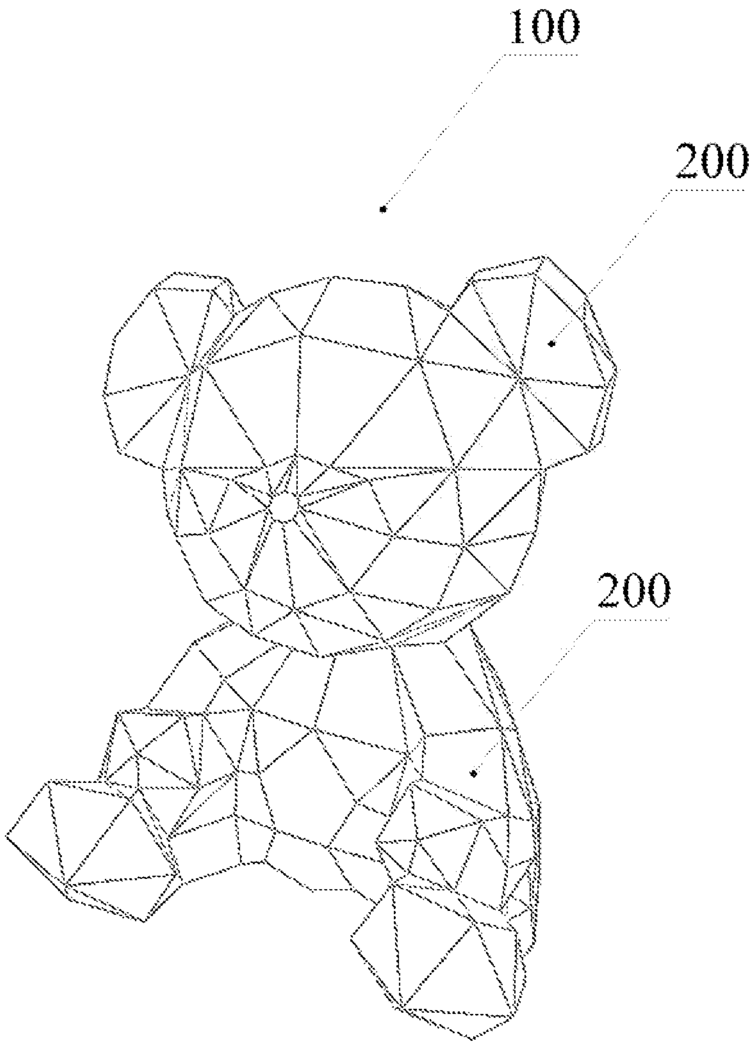
FIG. 1 is a schematic diagram of a novel three-dimensional modeling lamp provided by the present invention.
Figure 2:
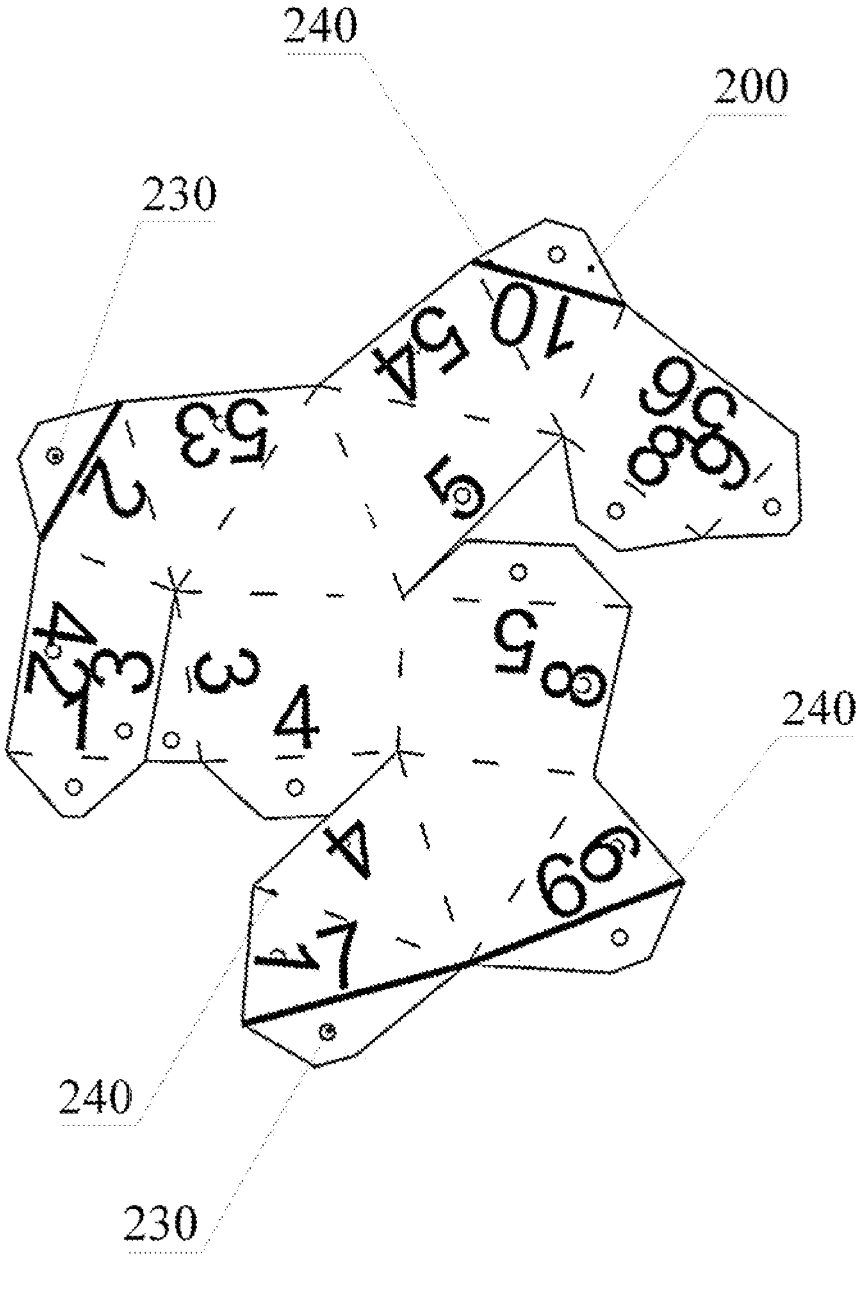
FIG. 2 is a schematic diagram of a sheet.
Figure 3:
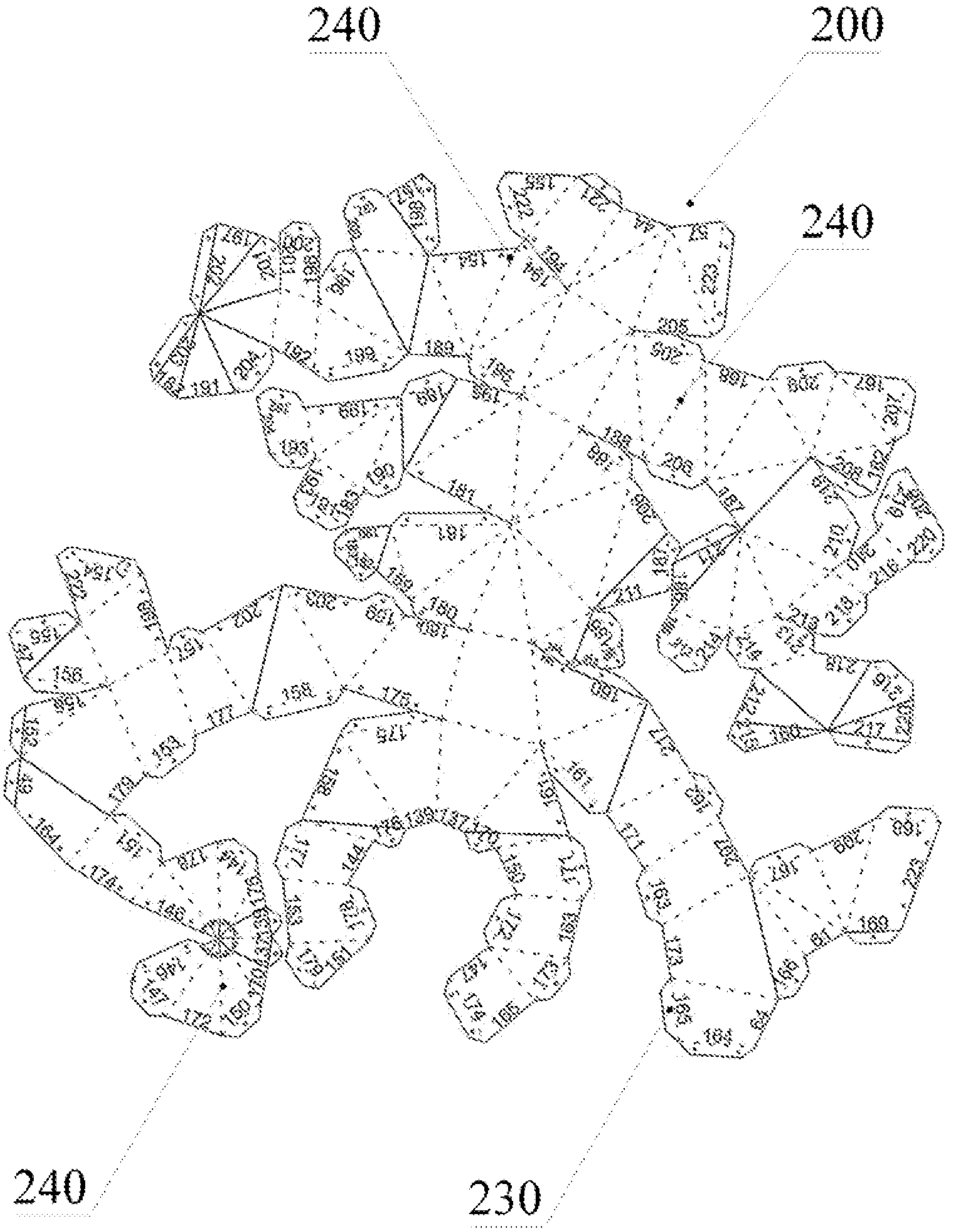
FIG. 3 is the second schematic diagram of the sheet.
Figure 4:
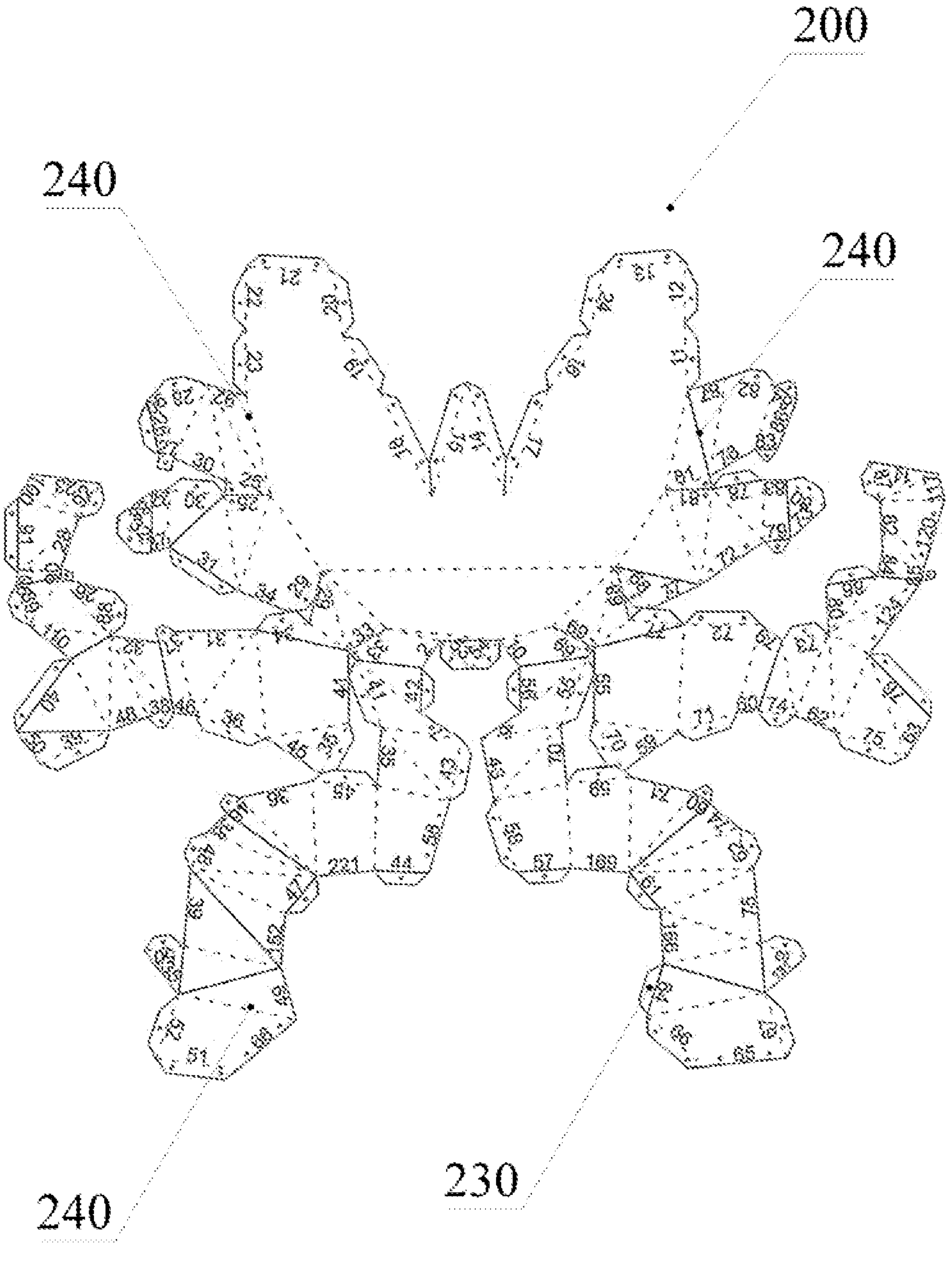
FIG. 4 is the third schematic diagram of the sheet.
Figure 5:
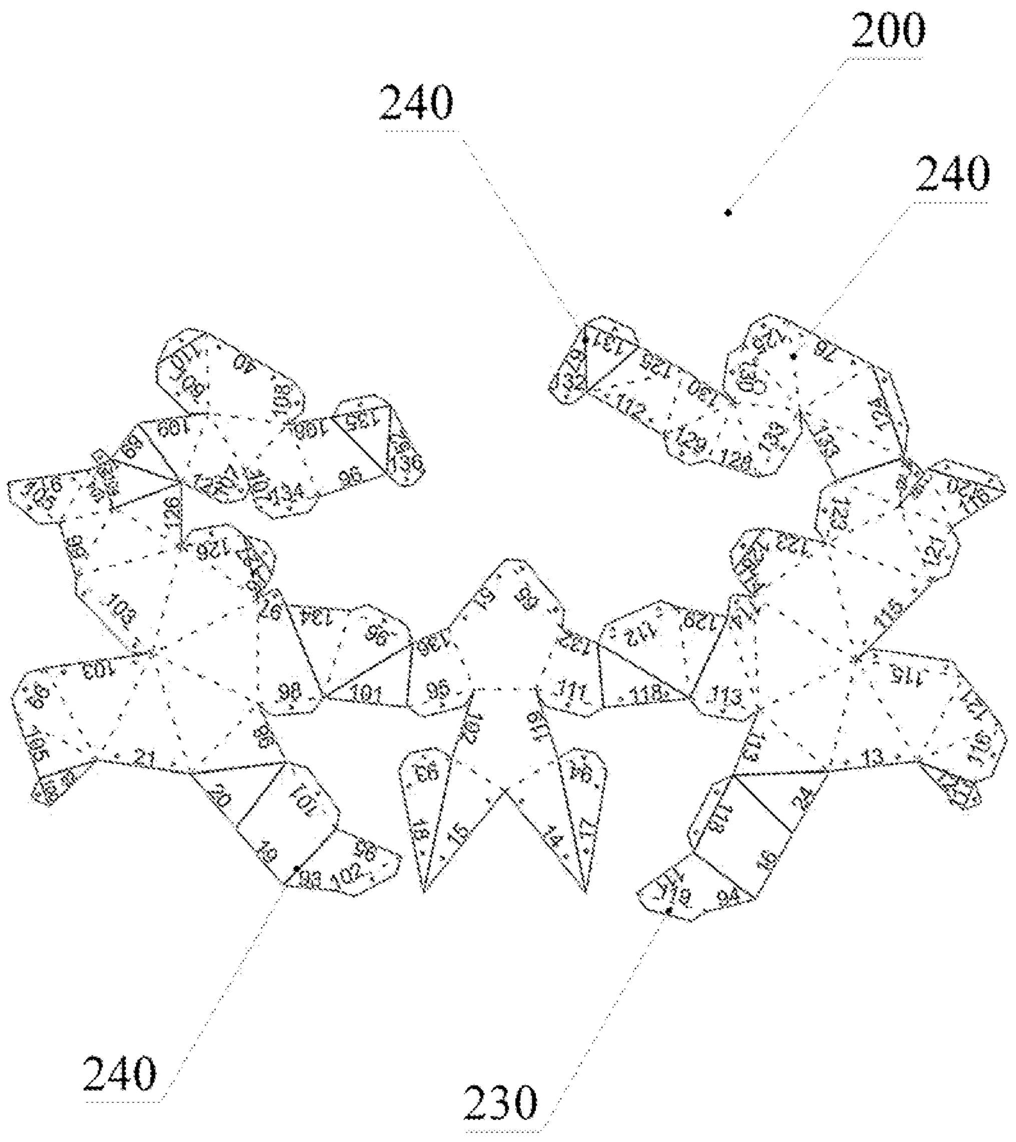
FIG. 5 is the fourth schematic diagram of the sheet.

100, Three-dimensional modeling lamp; 200, Sheet; 210, PET layer; 220 Laser colorful film layer; 230, Installation hole; 240, Indentation; 300, Connector; 310, Limit disc; 320, Barb; 600, Metal skeleton.

DESCRIPTION OF EMBODIMENTS

In the following, the technical scheme in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by those skilled in the art without creative labor belong to the protection scope of this application.

Reference to "an example" or "an embodiment" herein means that a particular feature, structure or characteristic described in connection with an embodiment or an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for the sake of convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for the convenience of description. The positional relationship of the constituent elements is appropriately changed according to the direction of the described constituent elements. Therefore, it is not limited to the words and expressions described in the specification, and can be replaced appropriately according to the situation.

As shown in FIGS. 1 to 8, the novel three-dimensional modeling lamp provided by the present invention includes a lamp shell and a light source arranged inside the lamp shell, wherein the lamp shell forms a preset three-dimensional modeling by connecting by a plurality of sheets 200 with different shapes through connectors 300, wherein the sheets 200 comprise a light-transmitting PET layer 210 and a colorful film layer 220, and the colorful film layer 220 refracts light emitted by the light source, so that the lighting effect of the three-dimensional modeling lamp 100 is better; and a plurality of indentations 240 are formed on the sheets 200, and the indentations 240 guide a user to splice and shape the sheets 200 more conveniently.

Figure 6:
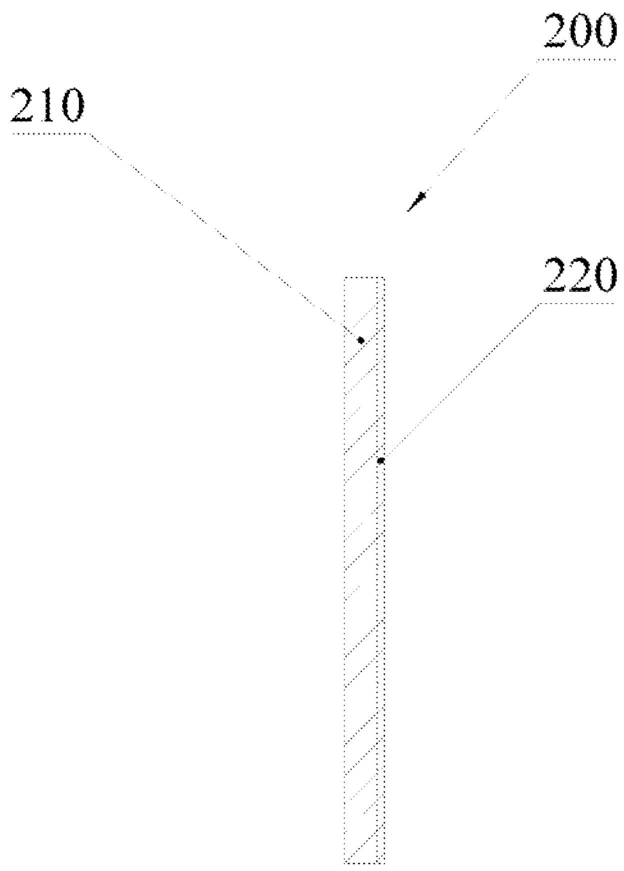
FIG. 6 is a sectional view of the sheet.

As a preferred embodiment of the present invention, as shown in FIG. 6, the sheet 200 includes a light-transmitting PET layer 210. PET is a kind of polyester plastic, which has good transparency and light transmittance, and the light transmittance is over 90%. The lampshade made of a PET material can effectively improve the light transmittance and brightness, making the light of lamps more uniform and softer. In addition, PET material also has the advantages of light weight, heat resistance, weather resistance, chemical corrosion resistance, easy processing and molding, and long service life.

In order to further enhance the lighting decoration effect of the three-dimensional modeling lamp, as shown in FIG. 6, in this embodiment, one side or both sides of the PET layer 210 are covered with a colorful film layer 220. The colorful film is a plastic composite film which is melted by two or more resins with different refractive indexes and sequentially overlapped by co-extrusion technology, and has good permeability and bright brightness, so that no matter what kind of glass is used, a dream staggered effect will appear. Colors are different from any angle, and the use of colorful film layer 220 makes the three-dimensional modeling lamp better in lighting effect, more dreamy and ornamental. In this embodiment, both sides of PET layer 210 are covered with colorful film layer 220; in some embodiments, PET layer 210 can also be covered with colorful film layer 220 only on one side, which can also achieve better lighting effect, and users can configure it according to actual use requirements.

Figure 7:
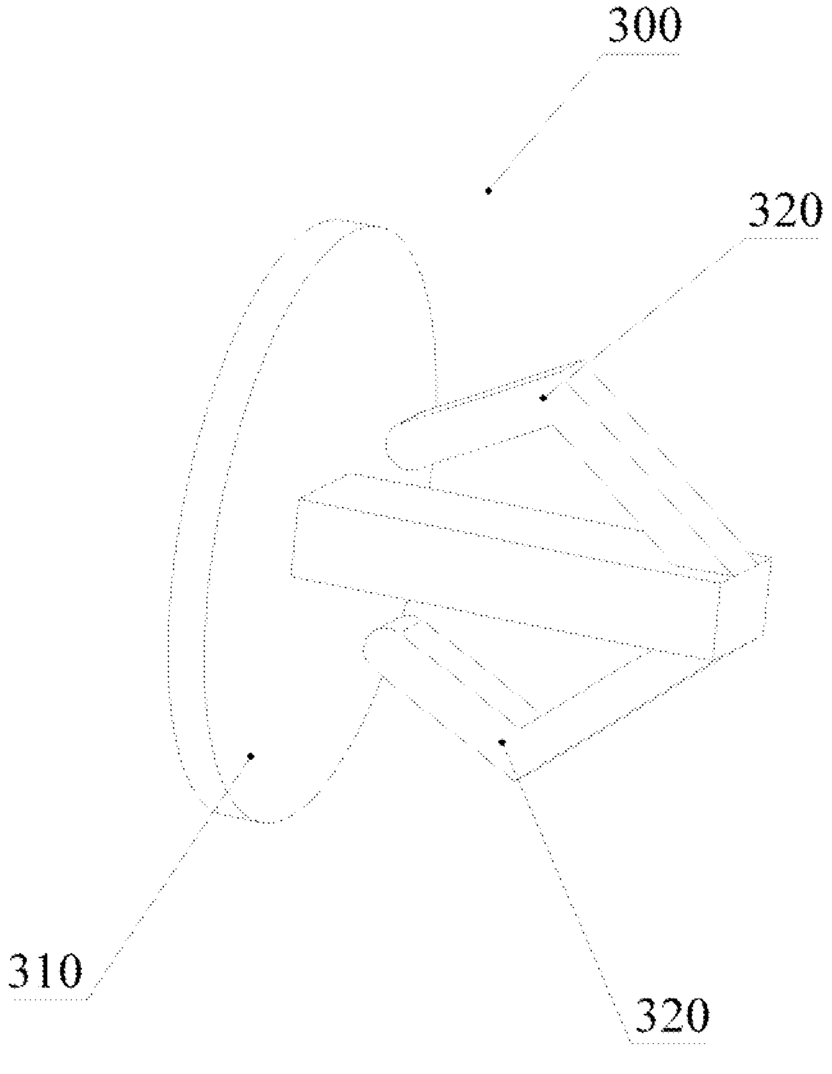
FIG. 7 is a schematic view of the connector.
Figure 8:
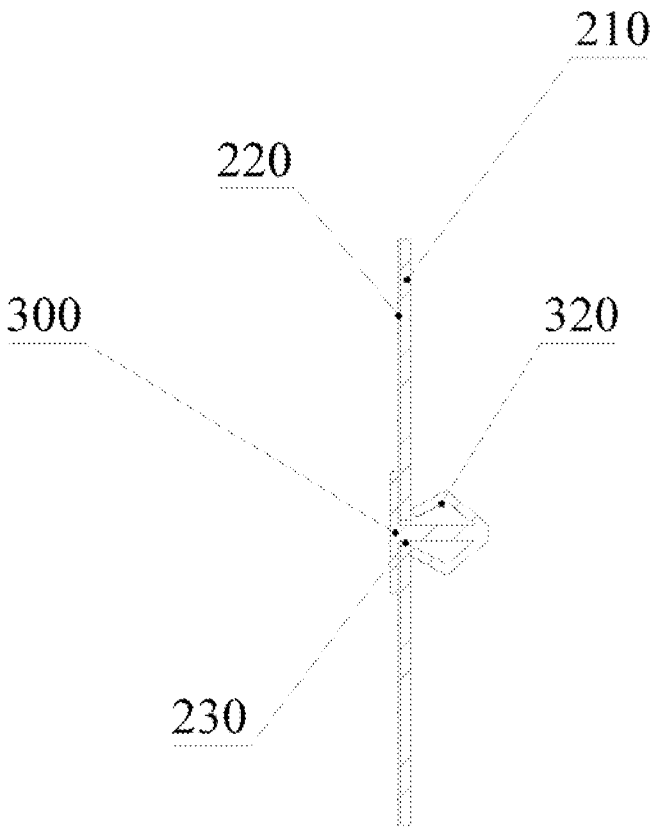
FIG. 8 is a schematic view of the connector passing through the installation hole.

The sheets 200 of the present invention are connected by the connector 300 to form a preset three-dimensional shape, and the outer edges of the sheets 200 are provided with a plurality of installation holes 230. During installation, the installation holes 230 of the two sheets 200 are aligned and the connector 300 is inserted therein to realize the fixed installation of the two sheets 200. Specifically, as shown in FIGS. 7 and 8, the connector 300 includes a limit disc 310 and barbs 320. The barb 320 is configured to be made of an elastic material, so that the barb 320 can be compressed and has a compressed state. When the connector 300 passes through the installation hole 230, the barb 320 is compressed and passes through the installation hole 230. The lateral width of the barb 320 in the compressed state is smaller than the diameter of the installation hole 230, while when the barb 320 passes through the installation hole 230 and returns to a normal state, the lateral width of the barb 320 is larger than the diameter of the installation hole 230, and the end of the barb 320 abuts on the outer side of the installation hole 230, so that the barb 320 can effectively prevent the connector 300 from falling out of the installation hole 230.

In this embodiment, the installation hole 230 is configured as a through hole, and in some embodiments, the installation hole 230 can also be a threaded hole, and a plurality of sheets 200 are fixed by screws. In some embodiments, a metal piece can be added to the outer peripheral edge of the installation hole 230 to enhance the structural strength of the installation hole 230. In some embodiments, the connector 300 may also take the form of a rivet, which is used to make the connection between the sheets 200 more compact and stable.

In order to make the installation process of the sheet 200 more accurate and fast, the present invention also provides a plurality of indentations 240 (see FIG. 2 to FIG. 5) on the sheet 200, which can help users to quickly fold the sheet 200 for installation. In this embodiment, dotted lines and solid lines (see FIG. 2 to FIG. 5) are also provided on the indentations 240 to indicate different folding directions, which makes the installation process of the sheet 200 more accurate and less prone to errors. In some embodiments, characters or numbers can also be set beside the indentation 240, so that users can know the installation mode more clearly.

As a preferred embodiment of the present invention, the light source of the present invention is preferably configured as a LED strip, and the LED strip is soft, efficient and energy-saving, at the same time, it is green and environmentally friendly, and it is used more and more as a decorative light source. The LED strip of the present invention is installed inside the lamp shell, specifically, the LED strip is arranged along the connector 300. In this embodiment, LED strip can be attached to the periphery of the connector 300 through an adhesive, and in some embodiments, led strip can also be formed with the connector 300 by using other fasteners. Finally, the LED strip is evenly distributed in the lamp shell, and the light emitted by LED strip can fully illuminate the lamp shell, so that the lighting effect of the three-dimensional modeling lamp 100 is better, and the shadow will not appear because the light cannot be irradiated. In other embodiments, the light source can also be configured as a thermal radiation light source, a gas discharge light source or other forms of electroluminescent light source to meet the use needs of different users.

In the present invention, a power supply module is arranged inside the three-dimensional modeling lamp 100, and the power supply module provides power for the light source. Specifically, the power module is arranged at the bottom of the lamp shell, so that the center of gravity of the three-dimensional modeling lamp 100 is in a lower position, and the placement of lamps is more stable. In some embodiments, in order to facilitate the maintenance of the power module, the power module can also be arranged outside the lamp and electrically connected with the LED lamp inside the lamp through the power cord.

In this embodiment, the three-dimensional modeling lamp 100 also includes a photosensitive resistor, which makes the light source automatically turn on at night and turn off during the day by sensing the change of external light, further saving power and prolonging the service life of the lamp.

In this embodiment, the power module is also provided with a mode selection button. By using this button, LED strip can be controlled to show different lighting effects, such as switching lighting colors in static mode, and LED strip can also be controlled to show lighting effects in a breathing mode and a wave mode. In some embodiments, the LED strip can also be remotely controlled, and users can remotely control the lighting effect of led strip through a remote controller or mobile phone, which is further convenient for users and improves their experience.

Figure 9:
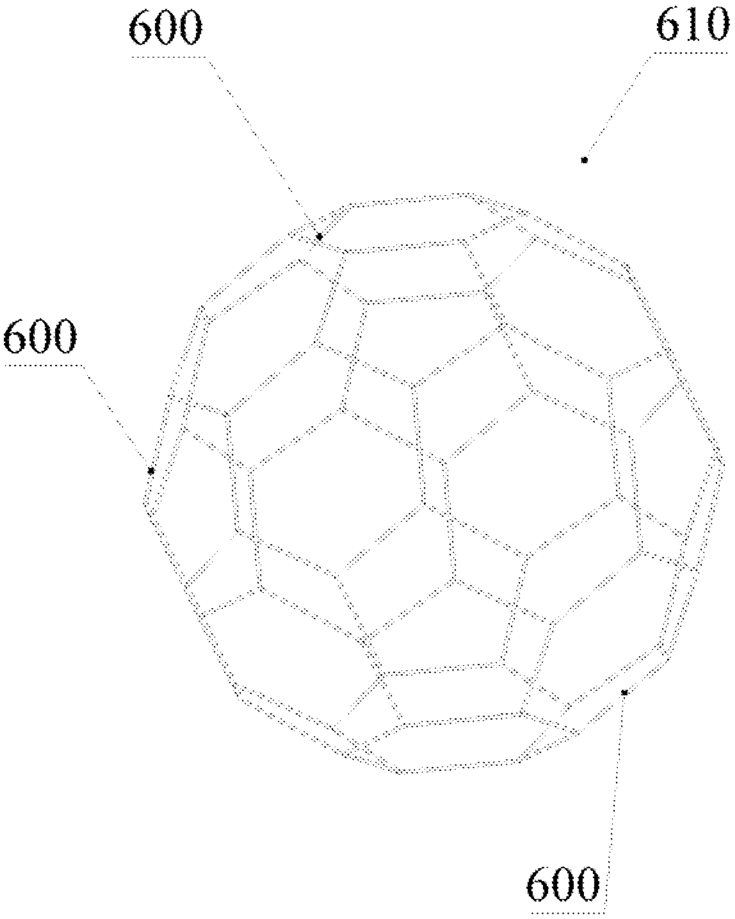
FIG. 9 is a schematic diagram of three-dimensional skeleton modeling.

In another embodiment of the present invention, as shown in FIG. 9, the present invention also provides a novel three-dimensional modeling lamp, which comprises a lamp shell and a light source arranged inside the lamp shell, wherein the lamp shell and the light source arranged inside the lamp shell also comprise a plurality of skeletons 600, and the skeletons 600 are spliced to form a three-dimensional skeleton modeling 610, and the lamp shell is connected by a plurality of sheets 200 with different shapes through connectors 300, and the three-dimensional skeleton modeling 610 is covered correspondingly one by one. Among them, the sheet 200 includes a light-transmitting PET layer 210 and a colorful film layer 220. The colorful film layer 220 refracts the light emitted by the light source, so that the lighting effect of the three-dimensional modeling lamp 100 is better. A plurality of indentations 240 are also formed on the sheet 200, and the indentations 240 guide users to splice and shape the sheet 200 more conveniently and quickly.

In this embodiment, the three-dimensional skeleton model 610 formed by splicing a plurality of skeletons 600 can further improve the structural strength and service life of the lamp. Specifically, the skeletons 600 can be assembled and spliced together through the formation of screws. In some embodiments, in order to reduce the weight of the lamp, high-strength plastic parts can be used as the skeletons 600, and then assembled and spliced together through screws or buckles.

As shown in FIG. 10, the present invention also provides a method for manufacturing a novel three-dimensional modeling lamp, which includes the following steps:

a, selecting a PET material with corresponding size and thickness according to a preset body size of the three-dimensional modeling lamp, and flatly adhering a colorful film on one or both sides of the PET material by a laminating machine;

b, according to the preset external shape of the three-dimensional modeling lamp, a computer design end carrying out creasing and splitting the three-dimensional modeling lamp into a plurality of sheets with different shapes;

c, performing indentation treatment on a plurality of sheets with different shapes, which can be divided into two processing technologies according to the output demand: (1) according to the demand of small batch production, digital cutting stamping and indentation creasing are used, and creasing is formed at a processing end through digital cutting stamping and digital laser burning, so as to obtain each sheet in the method b; (2) according to the requirements of mass production, die stamping and creasing are used, the processing end designs and processes the metal cutting stamping and creasing die according to the shape data obtained by a design end, and a mechanical stamping equipment is used for cutting stamping and creasing, and a mechanical creasing equipment is used for creasing to obtain each sheet in the method b; and d, connecting the sheets in the method c through the connectors corresponding to the installation holes, and installation the sheets into a preset three-dimensional modeling lamp shell, and uniformly arranging and fixedly installation light sources inside the lamp shell.

In method a, the sheet 200 is cut to the corresponding size according to the preset lamp shape, and the colorful film layer 220 is stuck on its outer surface, so that the light passing through the sheet 200 has a better viewing effect.

In method b, the external shape of the three-dimensional modeling lamp can be designed by a computer first, and then the three-dimensional modeling lamp is divided into a plurality of sheets 200 with different shapes through the computer design end, and each sheet 200 after the splitting is flattened (see FIG. 2 to FIG. 5); in some embodiments, sheets with different shapes can also be numbered or labeled, which is convenient for the final rapid assembly and forming of lamps.

In method c, the thinned and split sheet 200 is also subjected to creasing operation. Specifically, according to the output demand, it can be divided into two processing technologies. For the requirement of small batch production, digital cutting stamping and indentation creasing are used, and creasing is formed at a processing end through digital cutting stamping and digital laser burning, so as to obtain each sheet in the method b; for the requirement of mass production, die stamping and creasing are used, the processing end designs and processes the metal cutting stamping and creasing die according to the shape data obtained by a design end, and a mechanical stamping equipment is used for cutting stamping and creasing, and a mechanical creasing equipment is used for creasing to obtain each sheet in the method b. In this embodiment, the mechanical creasing equipment can be used for creasing the sheet 200 in the form of cold pressing and die heating and ironing.

In this method, the sheet 200 is provided with creases, and users can assemble lamps more conveniently through the creases. In this embodiment (see FIG. 2 to FIG. 5), the creases are also provided with dotted lines and solid lines to guide users to fold the sheet 200.

In method d, the sheet 200 with creases is connected to the installation hole 230 through the connector 300, and installed into a preset three-dimensional modeling lamp shell, and at the same time, the light sources are uniformly arranged and fixedly installed inside the lamp shell.

The novel three-dimensional modeling lamp and the manufacturing method thereof provided by the present invention generate special optical effects by utilizing the refraction of light on the colorful materials; meanwhile, the double-layer stressed-skin structure of the PET layer and the colorful film composite layer is adopted, so that the three-dimensional modeling lamp presents the crystal-clear effect of the diamond crystal section, and is better in appreciation; on the one hand, the user can assemble the lamp by himself, which fully reflects the creative inspiration of the user; and during logistics and transportation, the lamp can be divided into a plurality of material packages, which further reduces the cost of logistics, transportation and storage; and the manufacturing method is novel, which can be used for the creasing and separation of lamp shells of any shape, and is widely used in the decoration and display applications of various scene types.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

What is claimed is:

1. A novel three-dimensional modeling lamp, comprising a lamp shell and a light source arranged in the lamp shell, wherein the light source is an LED strip, the lamp shell forms a preset three-dimensional modeling by connecting a plurality of sheets with different shapes through a plurality of connectors, each of the plurality of connectors comprises a limit disc and barbs, each of the plurality of sheets comprise a light-transmitting PET layer, a colorful film layer and a plurality of installation holes, the colorful film layer refracts light emitted by the light source, so that the lighting effect of the three-dimensional modeling lamp is better, a plurality of indentations are formed on each of the plurality of sheets, and the plurality of indentations guide a user to splice and shape the plurality of sheets more conveniently, and the plurality of connectors penetrates through the plurality of installation holes to fixedly connect the plurality of sheets and form three-dimensional modeling.

2. The novel three-dimensional modeling lamp according to claim 1, wherein the LED strip is arranged along the plurality of connectors to ensure that the LED strip is evenly distributed inside the three-dimensional modeling lamp, so that the lighting effect of the three-dimensional modeling lamp is more uniform.

3. The novel three-dimensional modeling lamp according to claim 1, wherein the indentation is further provided with a guide mark, and the guide mark guides the user to correctly splice and form the sheets.

4. The novel three-dimensional modeling lamp according to claim 1, wherein the three-dimensional modeling lamp further comprises a power module, which is arranged at the bottom of the lamp shell and provides power for the light source.

5. The novel three-dimensional modeling lamp according to claim 4, wherein the three-dimensional modeling lamp further comprises a photoresistor, and the photoresistor makes the light source automatically turn on at night and turn off during the day by sensing the change of external light.

6. The novel three-dimensional modeling lamp according to claim 5, wherein the power module is further provided with a mode selection button, so that different lighting effects can be switched for the light source.

7. A novel three-dimensional modeling lamp, comprising a lamp shell and a light source installed inside the lamp shell, wherein the light source is an LED strip, the lamp shell further comprises a plurality of skeletons;

the plurality of skeletons are spliced to form a three-dimensional skeleton modeling; the lamp shell is formed by connecting a plurality of sheets with different shapes through a plurality of connectors, each of the plurality of connectors comprises a limit disc and barbs, and the three-dimensional skeleton modeling is covered correspondingly one by one; wherein each of the plurality of sheets comprise a light-transmitting PET layer a colorful film layer, and a plurality of installation holes, and the colorful film layer refracts light emitted by the light source, so that the lighting effect of the three-dimensional modeling lamp is better; and a plurality of indentations are formed on each of the plurality of sheets, and the plurality of indentations guide a user to splice and shape the plurality of sheets more conveniently, and the plurality of connectors penetrates through the plurality of installation holes to fixedly connect the plurality of sheets and form the preset three-dimensional modeling.

8. A method for manufacturing a novel three-dimensional modeling lamp, comprising:

selecting a PET material with corresponding size and thickness according to a preset body size of the three-dimensional modeling lamp, and flatly adhering a colorful film on one or both sides of the PET material by a laminating machine;

according to the preset external shape of the three-dimensional modeling lamp, a computer design end carrying out creasing and splitting the three-dimensional modeling lamp into a plurality of sheets with different shapes;

performing indentation treatment on a plurality of sheets with different shapes, which can be divided into two processing technologies according to the output demand: (1) according to the demand of small batch production, digital cutting stamping and indentation creasing are used, and creasing is formed at a processing end through digital cutting stamping and digital laser burning, so as to obtain each sheet in the method (2) according to the requirements of mass production, die stamping and creasing are used, the processing end designs and processes the metal cutting stamping and creasing die according to the shape data obtained by a design end, and a mechanical stamping equipment is used for cutting stamping and creasing, and a mechanical creasing equipment is used for creasing to obtain each sheet in the method b; and connecting the sheets in the method c through the connectors corresponding to the installation holes, and installation the sheets into a preset three-dimensional modeling lamp shell, and uniformly arranging and fixedly installation light sources inside the lamp shell.

9. The method for manufacturing a novel three-dimensional modeling lamp according to claim 8, wherein in method b, labels can also be arranged on the sheets with different shapes to make the method d faster and more accurate.

* * * * *